Aug. 9, 1938.　　　J. T. DALCHER　　　2,126,175
TESTING MACHINE AND MEASURING DEVICE THEREFOR
Filed Nov. 9, 1936　　　3 Sheets-Sheet 1
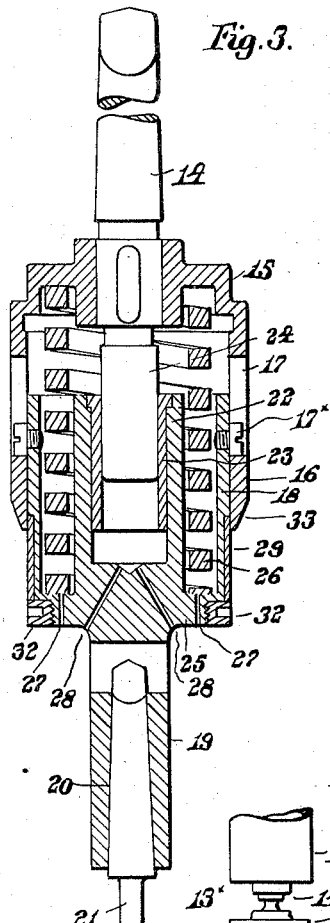
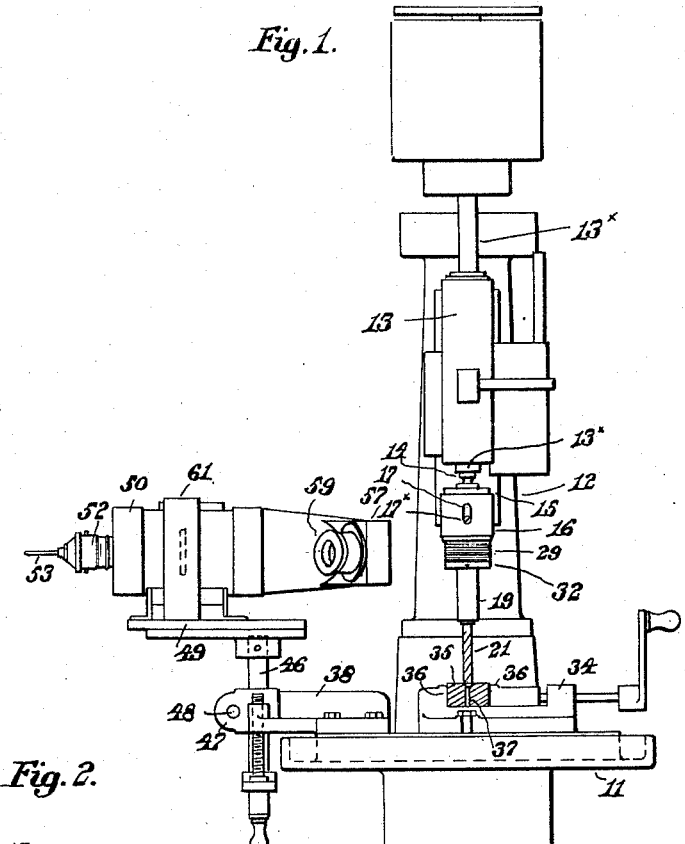
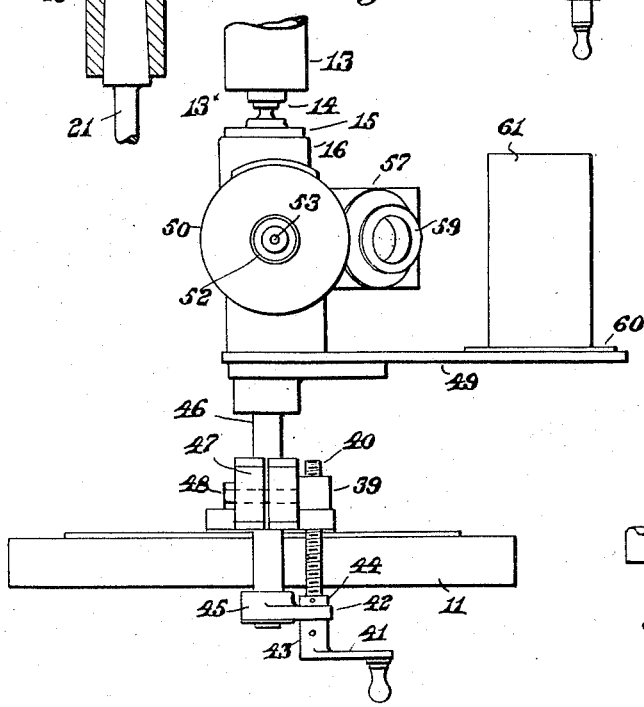
Inventor:
John T. Dalcher,
by Walter E. Lombard
Atty.

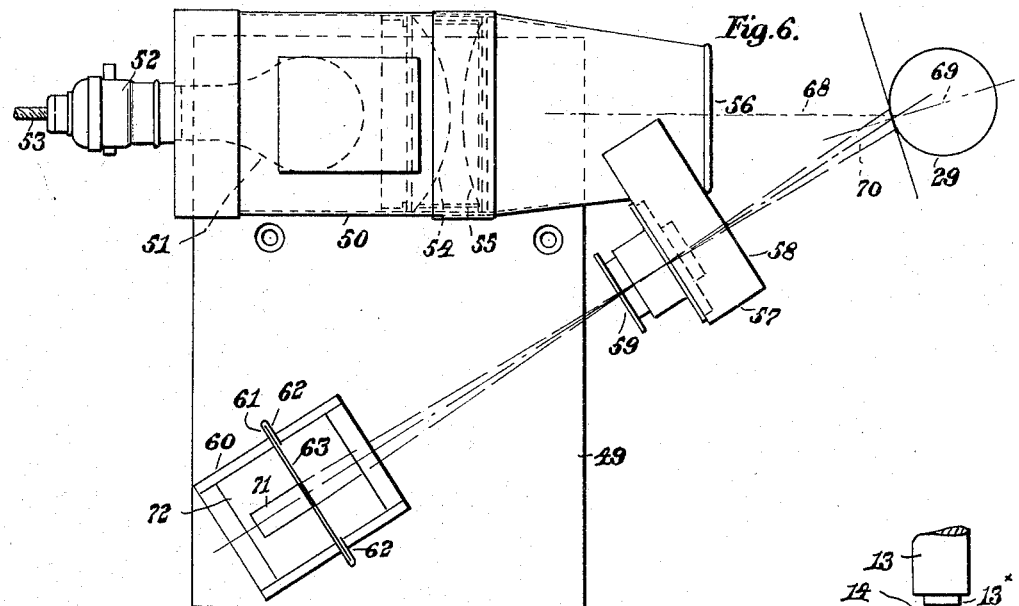
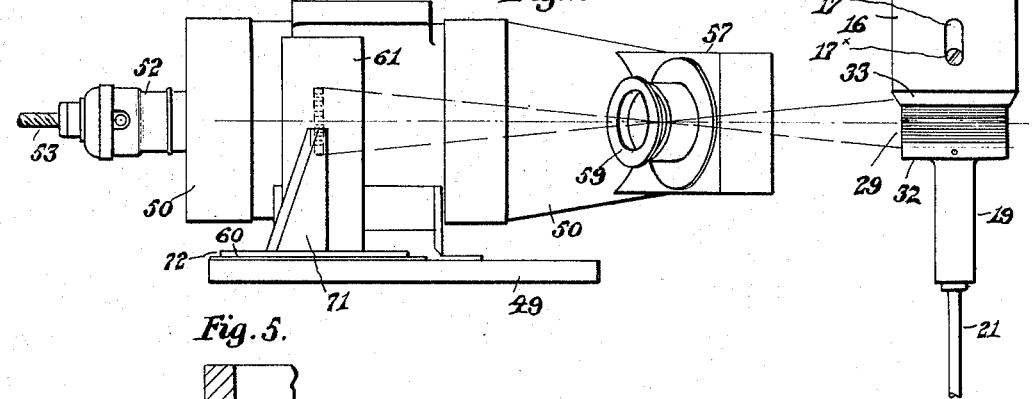
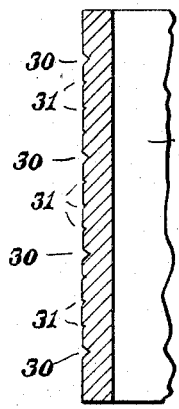
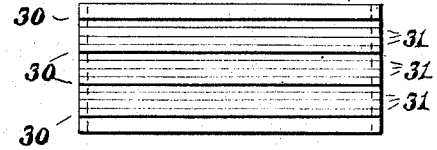

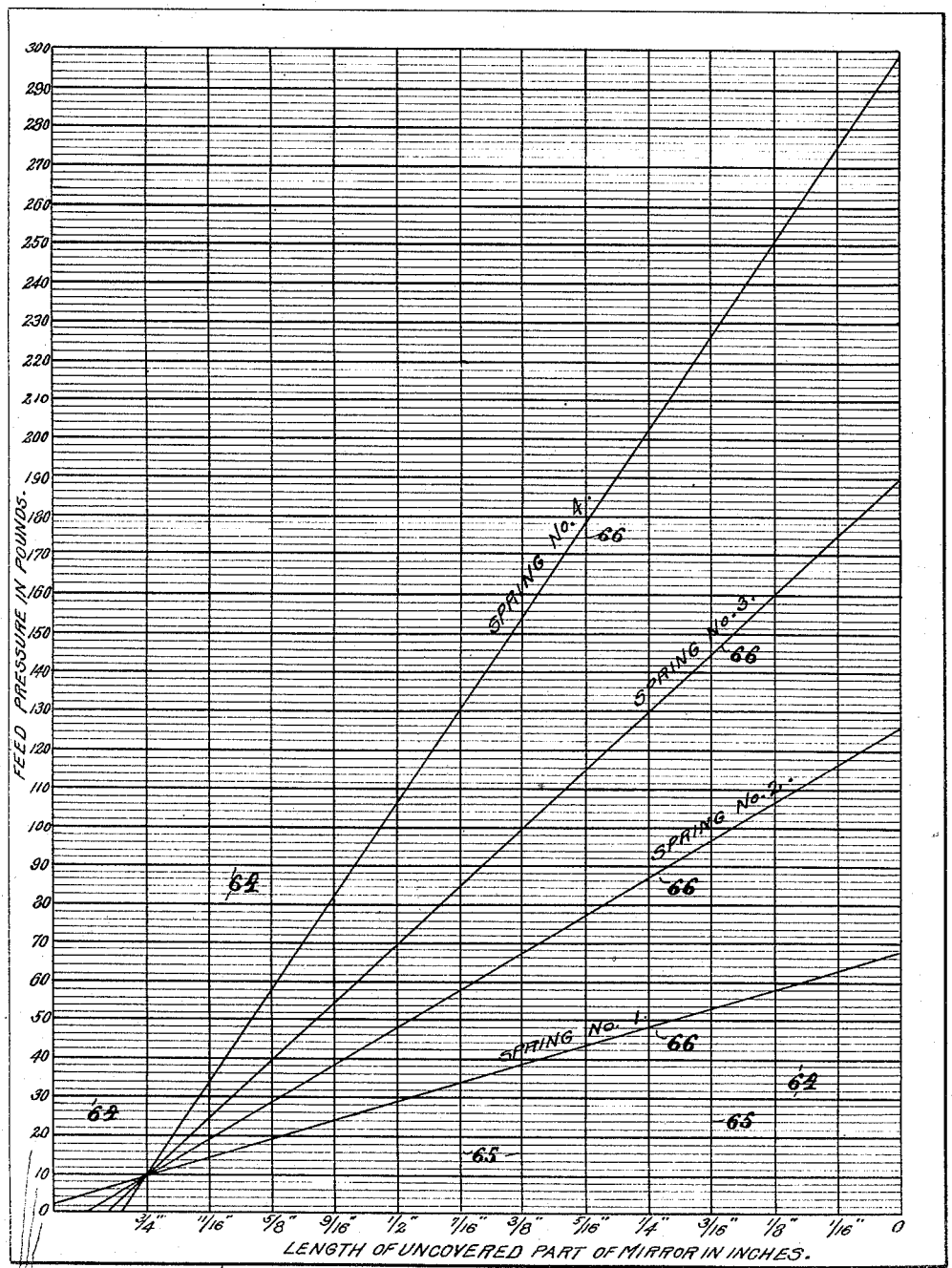

Patented Aug. 9, 1938

2,126,175

UNITED STATES PATENT OFFICE 2,126,175

TESTING MACHINE AND MEASURING DEVICE THEREFOR

John T. Dalcher, Laurence Harbor, N. J.

Application November 9, 1936, Serial No. 109,938

11 Claims. (Cl. 265—18)

This invention relates to means for testing samples of metals and measuring the hardness, toughness, etc., thereof, and has for its principal object the installation on a drill press or similar machine, of a measuring device having a mirror-like surface adapted to have rays of light projected thereon which rays will be deflected onto a screen and show an enlarged image of said measuring device.

Another object of the invention is the providing of a separate and previously prepared calibration chart or table having thereon lines and characters which will interpret the readings on said screen and thereby indicate the feed pressure in pounds required to machine various samples of metal or other material, based on scale readings on said screen.

A further object of the invention is the provision of means for determining the relative machinability of otherwise similar materials whereby a certain sample may be selected which proves to be the best adapted for the purpose of machining.

Another object is the provision of means whereby the required data relative to the characteristics of any sample may be indicated while the machine on which the measuring device is installed is in operation.

These objects are obtained by the mechanism illustrated in the accompanying drawings.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawings:

Figure 1 represents a front elevation of a drill press having associated therewith means embodying the principles of the present invention and adapted to be used in determining the degree of hardness of samples of metal while being drilled.

Figure 2 represents a side elevation of a portion of the same.

Figure 3 represents a vertical section of a spring-controlled measuring device forming a part of said drill press, said figure being drawn to an enlarged scale.

Figure 4 represents an elevation of the grooved index ring of said measuring device.

Figure 5 represents an enlarged vertical section of one wall of said index ring.

Figure 6 represents in diagram the relative positions of the measuring device, the means for illuminating the index ring of said measuring device, and the means for reflecting the grooves of said index ring upon a screen, the relative readings of which are to be applied on a chart from which the feed pressure in pounds may be obtained.

Figure 7 represents an elevation of the measuring device, the illuminating mechanism and the reflecting mechanism associated therewith, and Figure 8 represents a chart on which is indexed the amount of the length of uncovered part of mirror in inches and by applying the readings obtained from screen and knowing the number of spring fitted in the measuring device, the feed pressure in pounds may be quickly determined.

Similar characters indicate like parts throughout the several figures of the drawings.

In the drawings, 10 is the base of a drill press or similar machine provided with a bracket 11 and having a framework 12 extending upwardly above the bracket 11 and provided with a bearing 13 in which is mounted a shaft 13x adapted to be rotated in any well known manner.

The lower end of the shaft 13x has detachably mounted therein a spindle 14 adapted to rotate with said shaft.

The bearing 13, the shaft 13x, and the spindle 14 are adapted to have imparted thereto vertical movement relatively to the framework 12.

As the operating mechanism of the drill press forms no part of the present invention it is believed to be unnecessary to show or describe in detail the construction of the same.

A drill press is shown as an example of one means that the measuring device may be used but it is to be understood that said measuring device may be applied to many other types of machines.

The lower end of the spindle 14 has secured thereto a sleeve 15 having extending downwardly therefrom a cylindrical portion 16, the wall of which is provided with vertical slots 17.

Within the cylindrical portion 16 of the sleeve 15 is slidably mounted a member 18 having a downward extension 19 provided with a vertical tapered hole 20 to receive the upper end of a drill 21 or a similar operating tool.

The inside cylindrical surface of sleeve 15, 16 and the outside cylindrical surface of member 18 are concentric and have a small clearance to allow the two surfaces to slide, one on the other, in a vertical direction.

Within the member 18 is provided a cylindrical portion 22 in which is disposed an annular bushing 23.

The spindle 14 is provided with a cylindrical extension 24 which accurately fits into the bushing 23, thereby keeping the spindle 14 and drill 21 in perfect alinement at all times.

The bushing 23 is secured to the member 22.

The member 18 is provided with an annular wall 25 upon which rests a helical spring 26 surrounding the cylindrical portion 22 and the upper end of which bears against the upper wall of the sleeve 15 and normally retains the member 18 and sleeve 15 vertically extended as indicated in Fig. 3 of the drawings, the amount of such extension being limited by the length of the slots 17 into which extend the heads of screws 17x extending laterally from the member 18.

The headed screws 17x which project into the vertical slots 17 in the sleeve 15 permit the vertical movement of the sleeve 15 relatively to the member 18 when the spring 26 is compressed.

As pressure is applied when drilling, by the feeding mechanism of the drill press, the spiral spring 26 is compressed an amount depending on the hardness, toughness, etc., of the piece of material to be tested.

The wall 25 is provided with vent holes 27 and the member 18 is provided with vent holes 28 leading into the chamber beneath the annular bushing 23 and extension 24.

These vent holes 27 and 28 are for the purpose of allowing the air within the sleeve 15 to freely escape when the sleeve 15 is moved downwardly on the member 18.

The screws 17x projecting into the vertical slots 17 insure the rotation of the member 18 and drill 21 when the spindle 13x is rotated.

Surrounding the reduced portion of the member 18 is an index ring 29 which is more clearly shown in Figs. 4 and 5 of the drawings.

The outer surface of the index ring 29 is provided with a plurality of deep V-shaped grooves 30 and also between each pair of grooves 30 is provided with three shallow grooves 31 equally spaced apart, all as indicated in Figs. 4 and 5 of the drawings.

This index ring 29 is highly polished and has its outer face chromium plated, in this manner forming a mirror-like surface.

The grooves 30, 31 are so spaced on the index ring that they will indicate compression of the spring 26 on any suitable scale.

The index ring 29 is retained in position on the member 18 by means of a nut 32 threaded to the member 18.

The lower end of cylindrical portion 16 of the sleeve 15 fits over the upper end of the index ring 29 as indicated in Fig. 3 of the drawings, and has its lower outer face tapered as indicated at 33.

As the spring 26 is compressed while drilling, the sleeve 15, 16 will telescope over cylindrical part of member 18 and index ring 29, reducing the length of exposed mirror surface in direct proportion to pressure required, based on feed and speed of the drill press.

On the bracket 11 is mounted a device 34 in which is mounted a test bar 35 adapted to be clamped between the shoulders 36 in any well known manner.

The device 34 is positioned on the bracket 11 in such a manner that the test bar 35 will be directly beneath the drill 21 and said test bar is provided with a pilot hole 37 alined with the drill 21 so that only a portion of the metal will be acted upon by the drill during its rotation.

The object of the pilot hole 37 in the test bar 35 is to eliminate pressure and resistance of the tip of the drill on the bar 35 being tested, this hole 37 preferably being previously drilled with a small pilot drill so that the action of the larger or measuring drill 21 represents purely a cutting action and corresponding resistance.

As it is important to obtain the pressure required while the drill press is in motion, it becomes necessary to provide suitable measuring apparatus, about as shown in Figs. 6, 7 and 8.

At one side of the bracket 11 and secured thereto is an outward extension 38 having an ear 39 thereon in which is mounted an adjusting screw 40 adapted to be rotated by the lever 41.

The lower end of the screw 40 rotates freely in an ear 42 between the hub 43 of the lever 41 and a collar 44 pinned to the screw 40.

The ear 42 projects from a hub 45 secured in any well known manner to the lower end of a rod 46 movable vertically in bearings formed in the bifurcated end 47 of the member 38.

By rotating the lever 41 the rod 46 may be raised or lowered and then clamped in adjusted position by means of the clamp screw 48.

Pinned or otherwise secured to the upper end of the rod 46 is a platform 49.

Superimposed upon this platform 49 is a casing 50 in which is mounted a standard electric light bulb 51 mounted in a socket 52 connected by means of wire 53 to any suitable electric current.

In front of the bulb 51 are suitable optical condensers 54 and 55 through which the rays from said bulb are projected through the open end 56 of the casing 50 onto the polished mirror-like surface of the index ring 29.

The condenser 54 preferably has a focal length of 6½ inches while the condenser 55 has a focal length of 15 inches.

The light rays from the lamp 51 and optical condensers 54, 55 are thrown directly onto the polished surfaces of the index ring 29 and from these polished surfaces are deflected through a projection lens to a plain white screen 63 on which the index lines will appear as black on illuminated background, as will be described hereinafter.

The casing 50 has formed thereon near its forward end another casing 57 projecting laterally from and at an angle to the casing 50 as shown in Fig. 6 of the drawings.

This casing 57 is open at its forward end 58 and at its opposite end is provided with a suitable projecting lens 59.

On the platform 49 is mounted a plate 60 having extending upwardly therefrom a rectangular metal frame 61 having on its forward face inturned flanges 62.

The center of this metal frame 61 is alined with the axis of the lens 59, all as shown in Fig. 6 of the drawings.

The metal flanged frame 61 and 62 is adapted to receive a plain paper sheet 63, preferably white in color, on which the amount of uncovered part of the mirror with its grooves is reflected when the mirrored surfaces are illuminated.

When the casing 50 and the sheet retaining member 61 and 62 are disposed as indicated in Fig. 6 of the drawings, and the bulb 51 is lit, said bulb will project a strong light on the mirror-like face of the index ring 29, which will then be deflected through the lens 59 onto the sheet 63 on which there will appear an image of the index grooves 30 and 31, these appearing as black on an illuminated background making them clearly readable.

The image of these grooves 30 and 31, appearing on paper sheet 63 as black lines, indicate the amount of uncovered mirror surface on any suitable scale; for instance as illustrated in this case, the grooves 31 are spaced $\frac{1}{16}"$ apart, and every fourth groove 30 is deeper, indicating a distance of $\frac{1}{4}"$ to facilitate quick reading.

These readings may be applied to the diagram of the previously prepared chart or table 163 shown in Fig. 8, the scale at the bottom being graduated from 0 to $\frac{3}{4}"$, by lines 65. The horizontal lines 64 indicate feed pressure in pounds.

The diagonal lines 66 represent compression of spring 26.

It will be understood that with each measuring device several springs 26 may be used with different degrees of compressibility, the table or chart 163 of Fig. 8 showing curves of four such different springs.

Assuming that the material to be tested shows an uncovered portion of index ring 29 to be $\frac{3}{8}"$, indicated by the image of lines 30 and 31 by reflections on sheet 63, the feed pressure for spring No. 1 will be 38 pounds, for spring No. 2, 67 pounds, and so forth.

When two or three samples of a similar material are to be tested, it will only be necessary to obtain the relative readings on sheet 63 for each sample in order to choose the one best adapted for its machinability, provided they are all tested with the same spring.

The table or chart 163 shown in Fig. 8 will only be used when feed pressure is required for the purpose of comparison with other materials where different springs are likely to be used.

Inasmuch as hardness and toughness, etc., of the various materials vary it will also change the pressure required on the drill.

Should the pressure be such as to compress the spring 26 to the maximum distance allowed on the measuring device, then the sleeve 15 will cover the index ring 29 entirely and no image will appear on the sheet or screen 63.

When this occurs the next heaviest spring will be inserted on the measuring device until a reasonable length of the index ring is exposed showing an image of the corresponding number of graduations on the sheet or screen 63 from which the actual pressure may be determined from the diagram, as illustrated in Fig. 8 of the drawings.

When the index ring 29 in the operation of the drill press moves into a lower or higher position, the illuminating and reflecting mechanisms may be lowered or raised in accordance with the new position of the index ring.

It is obvious that the distance between the center of the spindle 14 or measuring device and the sheet or screen 63 may vary to suit any enlargement desired.

As shown in Fig. 6 the distance between said screen and center represent a distance of $17\frac{1}{4}$ inches, thus producing an enlargement of 1 to $1\frac{1}{2}$, this however being only a concrete example.

It is quite evident that adjustment of the projecting lens and the position of the screen must always be made in order to harmonize and thus produce a clear and sharp image on the screen.

When it is desired to change the springs 26 the member 18 may be removed from the sleeve 15, 16 by first removing the screws 17x from said member 18.

The light rays from lamp 51 are projected on a line 68 offset from the center 69 of the index ring 29 and are thrown on the mirror-like surface of said ring 29 in such a manner that these rays will be deflected from said surface along a line 70 at an acute angle to the line 68, all as shown in Fig. 6 of the drawings.

The member 61, 62 is secured to a brace 71 secured to a movable plate 72 which may be moved endwise of the fixed plate 60 to adjust the position of screen 63 relatively to the lens 59.

By the mechanism hereinbefore described the relative machinability of otherwise similar materials may be easily determined.

It must be understood that the machine herein shown and described measures relative resistance only encountered in an actual machining operation.

The operation of the invention is as follows:

The testing drill is fed into the material by an adjustable, automatic feed mechanism, synchronizing with the speed of the drill. The reaction of the pressure and thrust of the drill is taken up by the spiral spring 26. This reaction is dependent on hardness and toughness of the material to be tested and will vary accordingly, with a corresponding reaction of the spiral spring.

The condition of test drill, such as angle of the cutting edge, or possible dullness, does not affect the reaction of the spring as long as the samples in question are drilled simultaneously or nearly so.

Applicant is only interested in the relative reaction between certain samples and as long as the same speed and feed is used, the resulting reaction will be directly comparable.

A very important feature of this test is, that resistance to machining is measured during the actual operation, which would be rather difficult and inaccurate if the readings of the lines or grooves 30 and 31 were to be taken directly from the revolving index ring 29.

For this reason, accurate measurements are facilitated by the introduction of an optical system, which includes an electric lantern, optical condenser, projection lens and screen, all of any well known make and the construction of which forms no part of the present invention.

The rays from the electric lamp pass through the condensers 54, 55 and illuminate that portion of the index ring 29, not fully covered by sleeve 15, 16. As index ring 29 is chromium plated and polished while the grooves 30, 31 are not, the rays are readily reflected through projection lens 59 and an image thereof appears on the screen 63 which is stationary, it being nothing more than a white sheet of paper or cardboard on which an image of the lines or grooves 30 and 31 appear as black lines on a white background.

While these lines or grooves 30 and 31 rotate at corresponding high speeds, the same as the drill, the reflection of these lines or grooves 30, 31 appear practically stationary and can be read with ease.

This optical system is so arranged, that the distance between projection lens and screen can be so adjusted, that an enlarged image of the lines or grooves 30 and 31 appears on the screen, making readings more definite and accuate.

As the spring is compressed by the reaction of the drill, the index ring 29 with its lines or grooves 30 and 31 will enter the sleeve 15, 16, the amount being in direct proportion to the compression of spring 26.

The greater the resistance to the cutting action of the drill, the greater will be the compression of the spring and the amount of overlapping of sleeve 15, 16 will also be correspondingly larger, so that the measuring or bottom edge 33 of the sleeve 15, 16 will cover up more index lines or grooves 30 and 31, and this amount not covered by sleeve 15, 16 presents a reading or indicator, which will be directly comparable between similar materials.

Assuming that the drill is dull, it will then take more power and correspondingly larger reaction of the spring, but if the samples to be tested are drilled with the same drill, the relative difference of reaction will be the same and therefore directly comparable.

Referring to Figure 4, the lines or grooves 30 are spaced ¼" apart, with 3 lines or grooves 31 between each pair of lines 30, so that the spacing between any adjacent lines represents a distance of 1/16". The heavier lines or grooves 30 when reflected on the screen facilitate reading of the scale by observing first the heavy line 30 and adding to it the number of fine lines, as for instance: 1 heavy line + 2 fine lines gives a total of ¼" + ⅛" = ⅜". Of course any other suitable scale may be used. The above is only given as a concrete example.

It will also be noted that due to the arrangement of the optical system the enlarged image of the scale appearing on the screen will be upside down, however, for the purpose in question this will not affect the result.

For normal usage, when relative values for closely similar materials are desired, the actual scale readings may be compared directly, for instance:

Readings may show the following results:
Sample 1—½"
Sample 2—⅜"
Sample 3—1/16"

If the same drill, speed and feed, has been used on these three samples, it will be noted that the maximum compression of the spring occurred on Sample 3 and the minimum on Sample 1, therefore, Sample 1 offers the least resistance to machining and would be chosen accordingly.

Referring to chart 163 Figure 8 it will be noted that for normal usage, when relative values for closely similar materials are desired, the actual readings as obtained from the screen, may be compared directly as explained in previous paragraphs.

In case a permanent record of such tests is kept, or if it is desired to express the readings obtained from the screen in values of pressure in pounds, these readings are transferred to a chart 163 as shown in Figure 8.

Applying the same example, previously cited, and assuming that the readings have been obtained while using spring No. 2, the screen 63 readings are plotted vertically on the lower horizontal scale and corresponding pressures are read at the intersection between the vertical lines 65 and the diagonal line 66 for spring No. 2, the resulting feed pressure in pounds is then obtained on scale at left, line 67.

Citing the previous example as an illustration the following results will be obtained:

|  | Screen readings | Feed pressure in pounds |
|---|---|---|
| Sample 1 | ½" | 48 |
| Sample 2 | ⅜" | 67 |
| Sample 3 | 1/16" | 78 |

The index ring, Fig. 4, and chart 163, Fig. 8, show markings in inches and feed pressures in pounds. They may be presented in any other standards of measures, such as for instances, millimeters and kilograms.

It must be understood that the drill press is provided with three speeds and three feeds as follows:

Speed, R. P. M.　　Feed in inches per rev.
1_____ 1,850　　1_____ .0029
2_____ 1,000　　2_____ .00595
3_____ 438　　　3_____ .0124

Either feed may be used with any of the three speeds, depending on material to be tested.

In all cases the feed of the drill is controlled automatically by the drill press, the human element being entirely eliminated. If it is desired to compare results between two or more testing machines, the pressure or reaction on the spring must be based on size of pilot hole, diameter of test drill, speed and feed of drill.

The mechanism is particularly valuable in metallurgical laboratories where samples are produced, each containing within certain limits the contents required by specification and the hardness of the samples may be within the particular limits specified but the sample to be finally chosen is the one that shows itself best adapted for the purpose of ease of machining.

Having thus described my invention, I claim:

1. Means for determining the machinability of metal consisting of a rotatable and reciprocable spindle forming a part of a drill press, a sleeve secured thereto and rotatable therewith, a member slidably mounted and fitting within said sleeve and rotatable therewith and provided with a vertical socket to receive a drilling tool adapted to act on said metal, a normally expanded compressible spring interposed between said sleeve and member, and an index ring carried by and surrounding said member and having a plurality of annular grooves in its outer surface exposed to view and over which said sleeve is adapted to move when said spring is compressed.

2. Means for determining the machinability of metal as set forth in claim 1 in which the index ring has certain of said annular grooves wider than others of said annular grooves.

3. Means for determining the machinability of metal as set forth in claim 1 in which said spindle is provided with a cylindrical extension, and a bushing secured within a socket in the upper end of said member and within which said extension is adapted to reciprocate and be enclosed.

4. Means for determining the machinability of metal as set forth in claim 1 in which said sleeve and member are limited in their movement relatively to each other by means of a projection on the latter extending into a slot in the former.

5. Means for determining the machinability of metal as set forth in claim 1 in which said spindle is adapted to be connected to the lower end of a positively driven rotatable and reciprocable plunger of a drill press the speed of rotation and endwise feed of which are automatically controlled.

6. Means for determining the machinability of metal as set forth in claim 1 in which said drilling tool is actuated by a drill press provided with mechanism for supporting the metal sample beneath said drill.

7. Means for determining the machinability of metal as set forth in claim 1 in which the drilling tool is actuated by a drill press provided with a fixed bracket having thereon supporting means for a plain white screen on which an image of the grooves on said index ring may be projected.

8. Means for determining the machinability of metal consisting of a rotatable and reciprocable spindle forming a part of a drill press, a sleeve secured thereto and rotatable therewith, a member slidably mounted and fitting within said sleeve and rotatable therewith and provided with a vertical socket to receive a drilling tool adapted to act on said metal, a normally expanded compressible spring interposed between said sleeve and member, an index ring carried by and surrounding said member and having a plurality of annular grooves in its outer surface exposed to view and over which said sleeve is adapted to move when said spring is compressed, and optical means for producing an enlarged image of the projecting portion of said index ring.

9. Means for determining the machinability of metal consisting of a rotatable and reciprocable spindle forming a part of a drill press, a sleeve secured thereto and rotatable therewith, a member slidably mounted and fitting within said sleeve and rotatable therewith and provided with a vertical socket to receive a drilling tool adapted to act on said metal, a normally expanded compressible spring interposed between said sleeve and member, an index ring carried by and surrounding said member and having a plurality of annular grooves in its outer surface exposed to view and over which said sleeve is adapted to move when said spring is compressed, certain of said grooves being wider than others of the grooves, and optical means for producing an enlarged image of the projecting portion of said index ring.

10. Means for determining the machinability of metal consisting of a rotatable and reciprocable spindle forming a part of a drill press, a sleeve secured thereto and rotatable therewith, a member slidably mounted and fitting within said sleeve and rotatable therewith and provided with a vertical socket to receive a drilling tool adapted to act on said metal, a normally expanded compressible spring interposed between said sleeve and member, an index ring carried by and surrounding said member and having a plurality of annular grooves in its outer surface exposed to view and over which said sleeve is adapted to move when said spring is compressed, said spindle being provided with a cylindrical extension, a bushing secured within a socket in the upper end of said member and within which said extension is adapted to reciprocate and be enclosed, and optical means for producing an enlarged image of the projecting portion of said index ring.

11. Means for determining the machinability of metal consisting of a rotatable and reciprocable spindle forming a part of a drill press, a sleeve secured thereto and rotatable therewith, a member slidably mounted and fitting within said sleeve and rotatable therewith and provided with a vertical socket to receive a drilling tool adapted to act on said metal, a normally expanded compressible spring interposed between said sleeve and member, an index ring carried by and surrounding said member and having a plurality of annular grooves in its outer surface exposed to view and over which said sleeve is adapted to move when said spring is compressed, said sleeve having a longitudinal slot therein and the member having a projection thereon entering said slot whereby relative motion of the sleeve and member is limited, and optical means for producing an enlarged image of the projecting portion of said index ring.

JOHN T. DALCHER.